(12) United States Patent
Phan et al.

(10) Patent No.: US 11,763,107 B2
(45) Date of Patent: Sep. 19, 2023

(54) SATELLITE IDENTIFICATION TAG

(71) Applicant: SRI INTERNATIONAL, Menlo Park, CA (US)

(72) Inventors: Samson Phan, Sunnyvale, CA (US); Leon Tao, Millbrae, CA (US); William Hoskins, Grover Beach, CA (US); Scott Gulkin, Royal Oaks, CA (US); Bryan Klofas, San Francisco, CA (US); Todd Koumrian, Palo Alto, CA (US); Michael Cousins, Ceres, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/357,706

(22) Filed: Jun. 24, 2021

(65) Prior Publication Data

US 2021/0406490 A1 Dec. 30, 2021

Related U.S. Application Data

(60) Provisional application No. 63/043,472, filed on Jun. 24, 2020.

(51) Int. Cl.
*G06K 7/10* (2006.01)

(52) U.S. Cl.
CPC .................. *G06K 7/10366* (2013.01)

(58) Field of Classification Search
CPC .................................................. G06K 7/10366
See application file for complete search history.

(56) References Cited

U.S. PATENT DOCUMENTS

2012/0182180 A1* 7/2012 Wolf .................. G01S 5/14
342/357.29

\* cited by examiner

*Primary Examiner* — Jamara A Franklin
(74) *Attorney, Agent, or Firm* — McDonnell Boehnen Hulbert & Berghoff LLP (57) ABSTRACT

Small, low-cost satellite systems, like CubeSats or other microsatellites, can exhibit reduced reliability relative to higher-cost satellite systems. This can result in difficulty identifying, communicating with, and tracking such satellite systems when they fail. Provided herein are reliable, low-cost, low-energy, turn-key systems for identification and tracking of small satellites that can be readily added to a microsatellite with minimal integration costs and while occupying a minimal amount of volume, mass, and external area of the host satellite. These systems are electrically isolated from the satellite bus, being powered by internal batteries or other separate energy sources and providing reliable identification and tracking even when the other systems of the satellite have failed. These improved identification and tracking systems include space environment sensors to maintain the system in a very-low-power state while the system is in vehicle processing and transit on Earth, extending device lifetime and reducing cost and weight.

18 Claims, 6 Drawing Sheets

SATELLITE IDENTIFICATION TAG

CROSS-REFERENCE TO RELATED APPLICATION

This application claims priority to U.S. Provisional Patent Application No. 63/043,472, filed Jun. 24, 2020, which is incorporated herein by reference.

BACKGROUND

Unless otherwise indicated herein, the materials described in this section are not prior art to the claims in this application and are not admitted to be prior art by inclusion in this section.

There is a growing need for unambiguously identifying and tracking of co-deployed CubeSats and other orbital objects. This is because CubeSat and Rideshare opportunities have dramatically driven the cost of launch down and enabled nontraditional entities to bring payloads to orbit. New constellation architectures based on smaller, less expensive CubeSats have also been developed. As a class, CubeSats have higher failure rates. The result is an explosion of new space objects that may or may not have their own integrated tracking solution. The Joint Space Operations Center (JSPOC), who traditionally have provided tracking for CubeSats and satellites alike at no cost, have expressed their desire for CubeSats to provide their own tracking capability, preferring to concentrate their resources on tracking unknown objects. Currently, operators must rely on their own internal identification methods, which have high failure rates.

As the cost to access has decreased, the number of objects in space, especially in lower orbits, has significantly increased. As a result, there is an increased need to identify and track such objects. However, such identification and tracking can be difficult to do unaided from the ground, as the small size and mass deployment of microsatellites renders their radar returns difficult or impossible to disambiguate. The presence of radio transmitters on such satellite systems configured to transmit identification signals, as well as other information useful to locating and identifying these systems (e.g., calibrated carriers to facilitate Doppler velocity detection) can alleviate some of these issues. However, the low cost of microsatellite systems means that many are "dead on arrival," or fail to operate after a short period of time, rendering identification and tracking as difficult, in many cases, as if these systems had not included a transmitter at all.

SUMMARY

Some embodiments of the present disclosure provide a system including: (i) an external unit, wherein the external unit includes an antenna and a sensor; (ii) a base unit, wherein the base unit includes a housing, a battery, and a controller; and (iii) a cable that electrically couples the external unit to the base unit; wherein the controller is configured to exit a low-power state in response to a signal from the sensor, and wherein the controller includes one or more processors configured to perform controller operations including: (a) detecting, based on a signal output from the sensor, that the system is in space; and (b) responsive to detecting that the system is in space, transmitting a radio frequency identification signal from the antenna.

Some embodiments of the present disclosure provide a satellite including: (i) a satellite bus, wherein the satellite bus comprises a payload controller, a payload power source, and a bus housing, wherein the bus housing has an external surface; and (ii) a radio identifier system including: (a) an external unit, wherein the external unit comprises an antenna, and wherein the external unit is disposed on the external surface of the bus housing; (b) a sensor; (c) a base unit, wherein the base unit comprises a base unit housing, an identifier system battery, and an identifier system controller; and (d) a cable that electrically couples the external unit to the base unit; wherein the identifier system controller is configured to exit a low-power state in response to a signal from the sensor, and wherein the identifier system controller comprises one or more processors configured to perform controller operations including: (1) detecting, based on a signal output from the sensor, that the system is in space; and (2) responsive to detecting that the system is in space, transmitting a radio frequency identification signal from the antenna.

Some embodiments of the present disclosure provide a method including: (i) transmitting, to an orbiting satellite from an Earth-based transmitter, a radio frequency identification request signal; (ii) receiving, from the orbiting satellite via an Earth-based receiver, a radio frequency identification signal; (iii) based on the radio frequency identification signal, determining a Doppler shift of the received radio frequency identification signal; and (iv) based on the determined Doppler shift, estimating at least one of a velocity or a location of the orbiting satellite.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

The reduction of per-pound cost to orbit, increase in number of launches, the rise of 'ridesharing' launch options, and other factors have resulted in a significant increase in the number of small, low-cost satellites in orbit. While this development has allowed for increased, broader access to space, this proliferation of objects in orbit has made the task of identifying and tracking those objects more difficult. Further, such small, low-cost satellites have high failure rates, meaning that transponders or other on-satellite elements used to facilitate tracking and identification of such object are often nonfunctional or marginally functional.

The embodiments described herein include low-cost turnkey radio frequency (RF) systems that can be easily and unobtrusively be added to satellites to provide reliable identification and tracking functionality. These RF identification systems can be optimized, tested, and certified by a single manufacturer, reducing costs and increasing reliability of the RF identification systems even when incorporated into unreliable custom microsatellite systems. These RF identification systems include internal power supplies, allowing the RF identification systems to be electrically isolated from the host satellite's other systems. This allows the RF identification systems to provide reliable identification and tracking functions even when the rest of the satellite has experienced power loss or failed in some other manner.

The RF identification systems described herein include a number of beneficial adaptations to their application as an independent system "added on" to the 'payload' aspects of a microsatellite system. These adaptations provide for reduced size, weight, power budget, cost, complexity of integration, and amount of external surface area of the host satellite system that is devoted to the RF identification system. Microsatellites often spend extended times on Earth after being incorporated into a launch vehicle but prior to being launched into the space environment, so these RF identification systems also include a light sensor (e.g. photovoltaic cell) or other space environment sensor to maintain the RF identification systems in a very low power state until after deployment, thereby further reducing cost, volume, and weight and extending operational lifetime.

The RF identification systems described herein are implemented as an "antenna unit" ("AU") that is disposed on an external surface of the host satellite and an "electronics unit" ("EU") that is tethered to the AU via a cable. The AU includes an antenna, related components (e.g., loading capacitors/coils), and a light sensor or other sensor element(s) configured to detect whether the AU is in the space environment. The EU includes a battery to power the RF identification system, a microcontroller to control the functions of the RF identification systems, and other components of the RF identification system (e.g., oscillators, power conditioning components, transceivers, data storage, modulators/demodulators, timers, etc.). The EU can be enclosed within a housing made of metal or some other material to enhance the electrical isolation of the RF identification system from the rest of the host satellite's systems. Such a housing can also provide enhanced mechanical protection to the RF identification system's components, sinking of heat generated by the RF identification system when in operation, simplified mechanical integration into the host satellite, or other benefits. While it is possible for the AU and EU to be contained within one module, providing the RF identification system as two discrete units (the AU and EU) connected via a cable allows for simplified, lower cost, lower complexity of integration into a host satellite system, allowing the user to select where to locate each of the discrete units semi-independently, only requiring the routing of a single cable between them.

Figure 1:
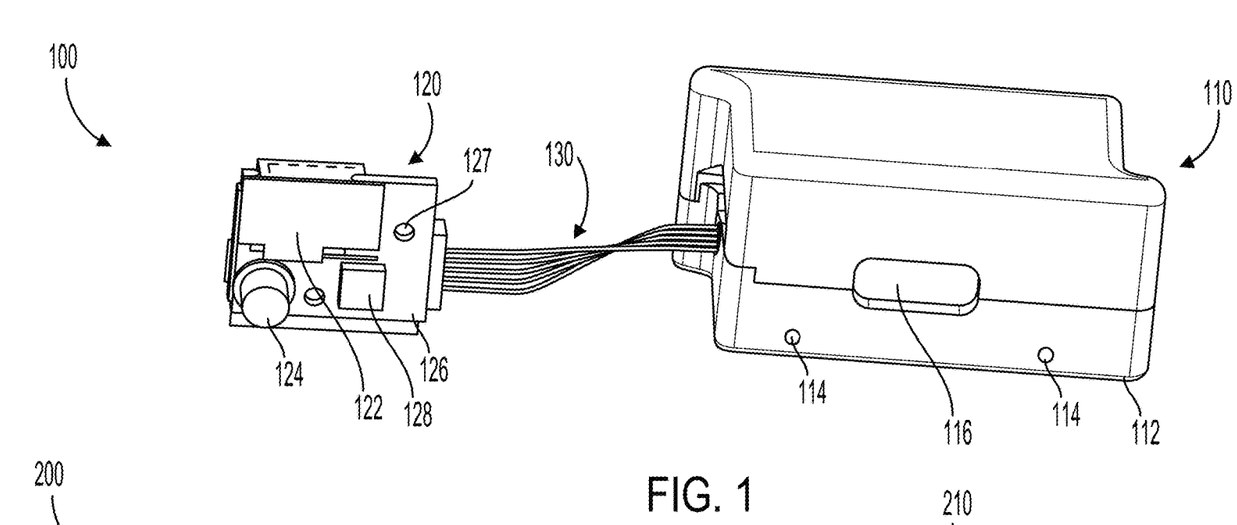
FIG. 1 illustrates elements of a satellite radio identification system, in accordance with an example implementation.

FIG. 1 illustrates an example RF identification system 100 as described herein. The system 100 includes an EU 110 connected to an AU 120 via a cable 130. The EU 110 includes a housing 112 that contains other elements of the EU 110. The AU 120 includes an antenna 122 and a light sensor 124 or other sensor configured to generate a signal that is indicative of whether the system 100 is located in the space environment.

The amount of external surface area available to a microsatellite system is often at a premium (e.g., much of the external surface area may be used for photovoltaics, antennas or sensors, etc.), so reducing the number of components included in the AU 120 to a minimum allows for the imposition of the RF identification system 100 on the external surface area budget to be reduced. As shown, the AU 120 can include a printed circuit board 126 or other substrate to which other components of the AU 120 can be mounted and which can be used to facilitate mounting of the AU 120 to an external surface of a host satellite. For example, the printed circuit board 126 of the AU 120 could include one or more mounting holes 127 formed therethrough to facilitate securely mounting the AU 120 to an external surface of a host satellite. The AU 120 can include an antenna 122 for providing RF identification, tracking, and other functionality. Associated electronics 128 (e.g., loading coils and capacitors) can also be provided as part of the AU 120. A light sensor 124 or other space environment detecting sensor can also be includes as part of the AU 120. In some examples, the AU 120 could have an area less than 1 cm square.

To reduce the area of the AU 120, the number of components present as part of the AU 120 could be reduced, e.g., by locating as many components (e.g., oscillators, filters, modulators, demodulators, amplifiers) as possible in the EU 110 rather than the AU 120, keeping the components other than the antenna 122 and/or light sensor 124 that are part of the AU 120 (e.g., capacitors, inductors, resistors, or other components used to load the antenna, to match impedances between the antenna, cable, and/or other components) to a minimum. The total area of the AU 120 could be further reduced by locating components other than the antenna 122 and/or light sensor 124 on a 'bottom' side of the printed circuit board 126. In some examples, the space environment sensor could be configured to provide a signal relating to pressure or some other variable that can be detected from the EU 110, in which case the space environment sensor could be included as part of the EU 110 rather than the AU 120, thus further reducing the area of the AU 120.

The cable 130 can include a number of conductors or other elements for electrically coupling the AU 120 to the EU 110. This can include coaxial cables, parallel-conductor cables, or other elements configured to transmit radio-frequency signals in a low-loss manner to/from the antenna 122. The cable could also include conductors to conduct power, ground, data, bias, or other signals related to a light sensor 124 or other space environment sensor on the AU 120. The length of the cable 130 could be one of a set number of lengths provided by a manufacturer and/or certifier of the cable 130. Alternatively, the cable 130 could be created by an end-user to have a length set according to the user's application (e.g., the distance from the location of the AU 120 to the location of the EU 110 within a user's satellite system along a specified routing along/through the satellite system). The cable 130 could be terminated in connector(s) to facilitate assembly of a satellite that includes the RF identification system 100.

The EU 110 includes a housing 112 within which a battery, microcontroller, additional space environment sensor(s), or other components of the EU 110 are disposed. The housing 112 can include one or more mounting features 114 (e.g., threaded holes) to facilitate mechanically incorporating the EU 110 into a host satellite system. The housing 112 could be composed of a sufficient mass of thermally conductive material (e.g., aluminum, copper, iron, steel, etc.) to sink heat from a microprocessor or other elements of the system 100. This could allow the RF identification system 100 to operate at higher transmit power levels and/or at higher duty cycles even in applications where the host satellite does not provide active or passive heat management to the RF identification system 100. For example, thermal paste or other means could be applied to facilitate sinking heat from microprocessors, amplifiers, transmitters, receivers, power management components, or other elements of the EU 110 into the housing 112.

The housing 112 can also act to protect the components of the EU 110 during integration into the host satellite and/or assembly of the host satellite, or afterwards (e.g., to protect components of the EU 110 from frayed wires, particulates, or other materials of or emitted by the host satellite and/or from the space or launch environment). In examples where the housing 112 is composed of a conductive material, the housing 112 could act to enhance the electrical isolation of the RF identification system 100 from the host satellite, e.g., by providing a grounded shield to prevent DC or AC (e.g., RF) electrical signals from being transmitted from the host satellite to electrical components within the housing 112.

Figure 2:
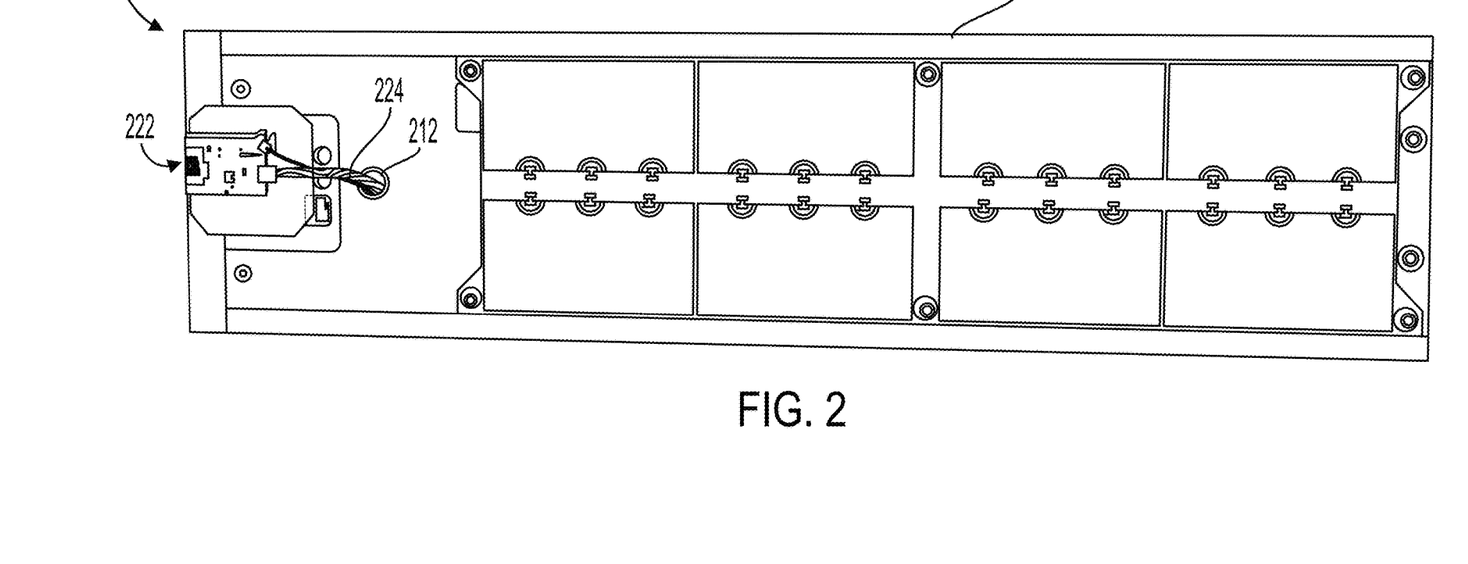
FIG. 2 illustrates elements of satellite that includes a radio identification system, in accordance with an example implementation.

FIG. 2 depicts an example satellite system 200 that includes an RF identification system as described herein. The satellite system 200 includes a host satellite bus 210 that is configured to provide most of the functionality of the satellite system 200. Thus, the host satellite bus 210 can include a bus housing that provide mechanical structure to the system 200, photovoltaic panels or other power generation or storage means that collectively form a payload power source, a payload controller, and/or other components (e.g., sensors, transmitters, receivers, antennas, cameras, gyroscopes, manipulators, automated laboratory instruments, etc.) related to an application or objective of the satellite system 200. The payload controller includes one or more processors configured to perform operations related to the application or objective of the satellite system 200, e.g., operating cameras, sensors, automated laboratory instruments, or other components to generate data related to an application or objective of the system, operating transmitters and/or receivers to receive commands, transmit data, or perform some other communications related to the application or objective of the system, or other functions. The payload power source provides power to the payload controller and other components of the host satellite bus 210.

The RF identification system of the example satellite system 200 includes an AU 222 coupled to an EU (not shown) via a cable 224. The EU is disposed within an outer bus housing of the host satellite bus 210 and the cable 224 passes through a hole 212 in that bus housing. The AU 222 is disposed on an external surface of the bus housing. The RF identification system is electrically isolated from the host satellite bus. This could be an absolute electrical isolation, wherein the RF identification system receives no power or other electrical signals from the host satellite bus but is electrically grounded to the host satellite bus (e.g., to prevent static discharges from building up between the host satellite bus and the RF identification system). Such complete isolation could protect the RF identification system from being damaged or otherwise being rendered incapable of providing RF identification and tracking functionality even when a failure of the host satellite systems includes the generation of high voltages. Alternatively, the RF identification system could be partially isolated from the host satellite systems, receiving command and communications signals, supplemental power, or other electrical signals from the host satellite bus. In such examples, fuses, surge protectors, blocking capacitors and/or inductors, optical isolation, or other components could be employed to prevent failure of the host satellite bus system from resulting in failure of the RF identification system. In either circumstance, the RF identification system can be configured to provide a minimum level of RF identification and tracking functionality regardless of the failure and/or marginal operational capacity of the host satellite bus systems.

The light sensor (e.g., 124) or other space environment-related sensor(s) of a RF identification system as described herein are provided so as to maintain the RF identification system in a very low power state until the RF identification system is in space. This can be done to reduce power consumption and/or to comply with emissions requirements while the RF identification system is, e.g., stored within a launching system awaiting integration into a complete launch vehicle, transportation to a launch site, waiting at the launch site and/or in storage for launch, being launched, or otherwise prior to being placed into the space environment in orbit around the Earth. This period of time can be variable and at least partially unpredictable (e.g., due to changing Earth and/or space weather conditions). Additionally, relying on the systems of a host satellite bus and/or launching system can be problematic due, e.g., to reliability issues with those systems. Accordingly, a space environment-related sensor can be configured to output, on a very low power budget, a signal that is related to one or more physical variables (e.g., visible or ultraviolet light flux, pressure) that are related to whether the RF identification system is located in space. For example, the space environment-related sensor could be a light sensor that outputs a signal to bring the RF identification system out of a low-power state when the light sensor is exposed to light, since the light sensor is unlikely to be exposed to light when loaded into a launching system (e.g., within a multi-CubeSat launcher and/or within a fairing of a launch vehicle).

The output of the light sensor or other space environment-related sensor could be connected to a field effect transistor (FET) or other electronic switch to control the electrical connection between a battery of the RF identification system and a microcontroller or other components of the RF identification system. Once such a microcontroller receives such power, it could act to maintain the electronic switch in a 'closed' position so that subsequent changes in the output of the sensor (e.g., due to the satellite entering the shadow of the Earth) do not result in power loss to the RF identification system. To prevent erroneous activation of the RF identification system prior to its being in space (e.g., due to temporary exposure of a light sensor to light as the host satellite system is loaded into a launching mechanism), the RF identification system could include a timer (e.g., a timer of a microcontroller) or other means to ensure that the electronic switch is only kept latched 'closed' if the output of the light sensor or other space environment-related sensor indicates that the RF identification system is in space for longer that a specified period of time (e.g., for longer than 45 minutes). This can allow the technicians a reasonable period of time to load the RF identification system and its host satellite into a launcher or other launch system without prematurely activating the RF identification system. Such a timer can also allow the RF identification system to delay activation until a sufficient time after being released as part of a group of satellites, thereby allowing the host satellite system to drift away from neighboring co-launched satellite before activating the RF identification system.

The RF identification system could also include one or more mechanical switches to keep the RF identification system in a low-power state even when the light sensor or other space environment-related sensor(s) are exposed to light or other relevant physical variables prior to launch. This could be done to provide additional time to assemble the RF identification to be assembled and/or integrate it into a host satellite, to transport or test the integrated satellite prior to insertion into a launch system, or other pre-launch activities.

Figure 3:
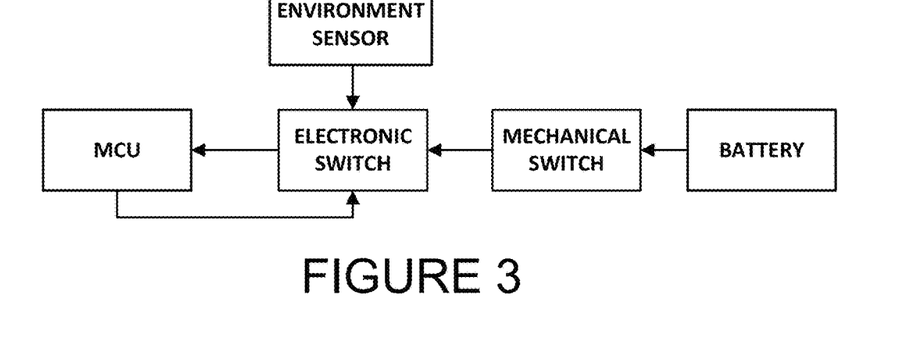
FIG. 3 is a block diagram that schematically illustrates elements of an example system.

FIG. 3 indicates elements of an example RF identification system, which includes a space environment-related sensor ("ENVIRONMENT SENSOR"), a controller ("MCU"), an electronic switch ("ELECTRONIC SWITCH"), a mechanical switch ("MECHANICAL SWITCH"), and a battery ("BATTERY"). The electrical connection from the battery to the MCU is controlled by the electrical switch and the mechanical switch. Once the mechanical switch is closed, the environment sensor can then provide power to the controller by electrically closing the electronic switch. The microcontroller can then maintain power to itself by keeping the electronic switch closed (e.g., after passage of a specified period of time, indicating that the system is in space and/or that the system has drifted sufficiently far away from co-launched satellite systems). The mechanical switch could be kept open until immediately before integration of the RF identification system and its host satellite bus into a launching system or other environment in which the environment sensor will not act to close the electronic switch. The mechanical switch could be closed to test the operation of the RF identification system and then opened again until immediately before integration of the RF identification system and its host satellite bus into a launching system or other environment in which the environment sensor will not act to close the electronic switch.

As shown in FIG. 3, the mechanical switch is "in series" with the electronic switch, but could alternatively provide power from the battery to close the electronic switch. In examples where the space environment-related sensor requires power to generate an output (e.g., the space environment-related sensor is a phototransistor), the space environment-related sensor could receive power from the battery via the mechanical switch, thus further reducing the power consumption of the RF identification system when the mechanical switch is open.

The space environment-related sensor of an RF identification system as described herein could include one or more elements that are sensitive to a variety of physical properties that are related to and/or indicative of the presence of the RF identification system in space. For example, the space environment-related sensor could include a photocell, a photodiode, a phototransistor, a photovoltaic cell, or some other variety of light sensor that is sensitive to infrared, visible, and/or ultraviolet light. Such a light sensor could be used to detect light emitted by an LED or other light-emitting element of a host satellite bus, to detect that the host satellite bus is operating the light-emitting element in order to, e.g., signal that the host satellite bus has determined that it is located in space. In another example, the space environment-related sensor could include a mechanical switch configured to change state (e.g. to close or to open) upon release from a launching mechanism. In yet another example, the space environment-related sensor could include an ultraviolet-sensitive material that disintegrates when exposed to ultraviolet light. In some examples, the space environment-related sensor includes a pressure-sensitive material and/or pressure sensor. In some examples, the space environment-related sensor includes a material that outgasses when exposed to pressures below a threshold pressure thereby adjusting an electrical property of the material. An RF identification system could include multiple space environment-related sensors to reduce the probability that the RF identification system activates prior to being released into orbit.

In examples wherein the space environment-related sensor includes a photovoltaic cell, the output of the photovoltaic cell could be used to power the RF identification system and/or to charge and/or recharge a battery of the RF identification system. In some examples, the RF identification system could be prevented from transmitting while in storage/on the ground by providing the RF identification system in a substantially discharged state (e.g., with a battery sufficiently discharged that the battery voltage is insufficient to power the RF identification system to generate RF signals). Once placed into orbit, the photovoltaic cell could act to power the photovoltaic cell and/or charge a battery thereof, allowing the photovoltaic cell to begin transmitting RF signals or performing other operations as described herein.

Figure 4:
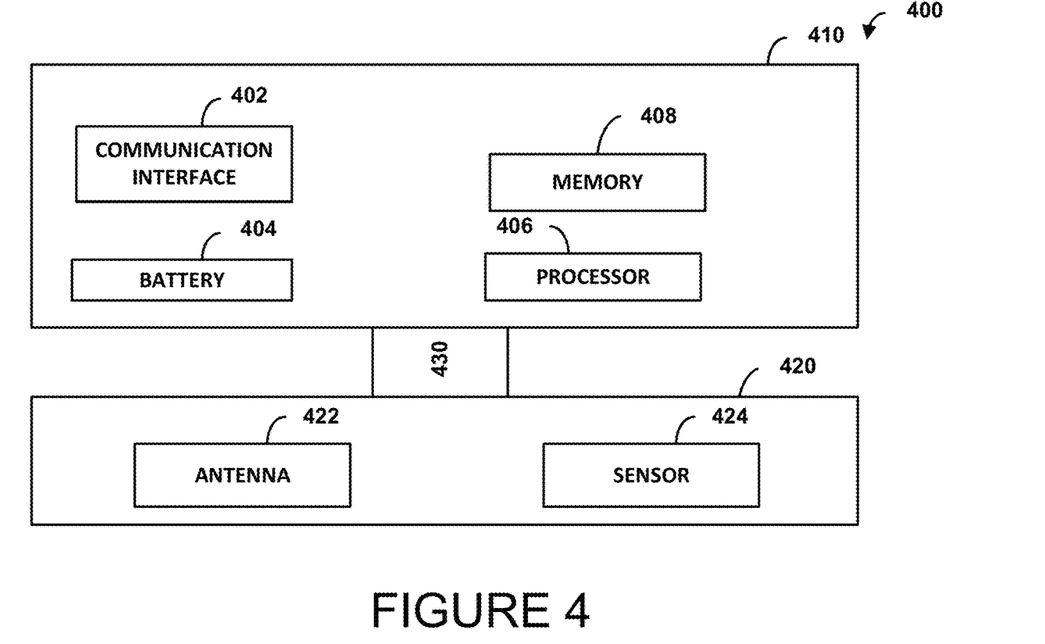
FIG. 4 is a block diagram that schematically illustrates elements of an example system.

FIG. 4 illustrates an example RF identification system 400 that may be incorporated into a host satellite bus to provide the identification, tracking, and other functionality described herein. As shown in FIG. 4, the RF identification system 400 includes an antenna unit ("AU") 420 coupled to an electronics unit ("EU") 410 via a cable 430. The EU 410 includes a communication interface 402, a battery 404, a processor 406, and memory 408, all of which may be communicatively linked together by a system bus, network, or other connection mechanism. The AU 420 includes an antenna 422 and a space environment-related sensor 424 (e.g., a light sensor).

Communication interface 402 may function to allow the processor 406 to communicate via the antenna 422, using analog or digital modulation of radio frequency signals, with other devices on Earth or in space. For example, the communication interface 402 may function to transmit and/or receive modulated RF signals at 915 MHz, 2457 MHz, and/or at some other frequencies of interest. The communication interface 402 may include power switches or otherwise be configured to allow the communication interface 402 to operate in a number of different power states, e.g., by supplying or removing power to respective different oscillators, amplifiers, receivers, or other elements of the communication interface 402. This could be done in order to allow the communication interface 402 to operate more efficiently.

For example, a first power state of the communication interface 402 could be a minimal-power state in which none of the communication interface 402 elements are powered, or in which only local oscillators or other long-time-to-operation elements are maintained in operation. A second power state could include powering an input amplifier and carrier detection circuitry (e.g., an amplifier, bandpass filter, rectifier detector, comparator, and/or other components) to allow the communication interface 402 to be operated to detect whether a carrier at a specified frequency is detectable using the antenna 422. A third power state could include powering components (e.g., amplifiers, oscillators, phase locked loops, frequency multipliers, demodulators, comparators, shift registers, arithmetic logic units or byte-wise comparators) sufficient to demodulate a received carrier and to at least partially decode a received communication so as to determine whether a response is required. This could include powering components sufficient to decode a received communication and to determine whether the received communication includes a command to the particular RF identification system 400 to transmit a response. A fourth power state could include powering components (e.g., amplifiers, oscillators, phase locked loops, frequency multipliers, modulators, shift registers) sufficient to generate and transmit a communication (e.g., to a ground station in response to receives a command from the ground station).

Processor 406 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of message encoding/decoding, timer generation, and message comparison, among other applications or functions. Memory 408 may include one or more volatile and/or non-volatile storage components, such as magnetic, optical, flash, or organic storage, and may be integrated in whole or in part with processor 406. Memory 408 may include removable and/or non-removable components.

Processor 406 may be capable of executing program instructions (e.g., compiled or non-compiled program logic and/or machine code) stored in memory 408 to carry out the various functions described herein. Therefore, memory 408 may include a non-transitory computer-readable medium, having stored thereon program instructions that, upon execution by the processor 406, cause the processor 406 to carry out any of the methods, processes, or functions disclosed in this specification and/or the accompanying drawings. Additionally or alternatively, the processor 406 may include state machines, timers, comparators, or other logic elements configured to implements the methods described herein without retrieving and/or interpreting stored program instructions.

By way of example, such program instructions may include instructions for operating the communication interface 402 to receive commands from a ground station on the Earth and to, in response to receipt of such commands, transmit identification, status, and/or tracking messages to the ground station. This could include decoding a command and/or ID field of a received command and, based on such decoded fields, determining to respond. In some examples, such a determination could include determining that the command field indicates that all receiving systems should respond and, in response, generating a transmission. In some examples, such a determination could include (i) determining that the command field indicates that only the system having a specified ID should respond and (ii) determining that the specified ID matches the ID of the receiving system and, in response, generating a transmission. In some examples, such a determination could include (i) determining that the command field indicates that every receiving system except the system having a specified ID should respond and (ii) determining that the specified ID does not match the ID of the receiving system and, in response, generating a transmission. In some examples, the process of comparing an ID field of a received command to the ID of the receiving system could be performed by circuitry of the communication interface 402, e.g., to allow for lower-power operation.

Such system-specific commands could be used to improve the detection, location, or other operations related to individual satellites that are launched in 'batches' with many other satellites at the same time from the same vehicle/launcher. In this way, a ground system can more easily and accurately identify and refine the estimated location of each such satellite (e.g., to generate improved-accuracy two-line elements (TLEs) that describe the orbit of each of the satellites). In some examples, the information content of the RF signals transmitted by the satellites could be specified to facilitate such localization. For example, an RF identification system could detect (e.g., using analog-to-digital converters, comparators, etc.) a temperature and/or a supply voltage of a transmitter used by the RF identification system to transmit RF signals in response to commands received from a ground station. The RF identification system could then transmit, as part of a signal transmitted in response to a request for such, an indication of the detected temperature and/or supply voltage. The ground station could then detect the transmitted signal and decode the detected temperature and/or supply voltage, using the temperature and/or supply voltage to generate an improved estimate of the 'true' frequency of the RF signal as transmitted from the RF identification system. This estimated 'true' frequency could then be compared to the detected frequency of the RF signal as received by the ground station, thus generating an improved-accuracy estimate of the Doppler shift experienced by the RF signal. This improved-accuracy estimate of the Doppler shift can then be used to generate an improved estimate of the velocity and/or location of the RF identification system.

As noted above, it is advantageous to operate such an RF identification system using very low power, so as to extend the period over which the RF identification system can reliably provide identification, tracking, and other functionality for its host satellite. This can be accomplished by only transmitting identification/tracking signals in response to receiving requests for such from a ground station or other requestor system. Average power consumption can be further reduced by placing in the system, including the controller and RF transmitter/receiver components, into a low-power 'sleep' state for most of the time, periodically exiting the sleep state to 'listen' for commands from a ground station. If such a command is detected while not in the sleep state, the system could then transmit a signal in response. Once the signal is transmitted, or if no command is detected after a specified period of time, the system could then resume the low-power 'sleep' state. Entering/exiting such a low-power 'sleep' state, or other power states, could include operating electrical switches to remove power to components or subsystems of one or more processors, communications modules, or other electronic circuitry.

Figure 5:
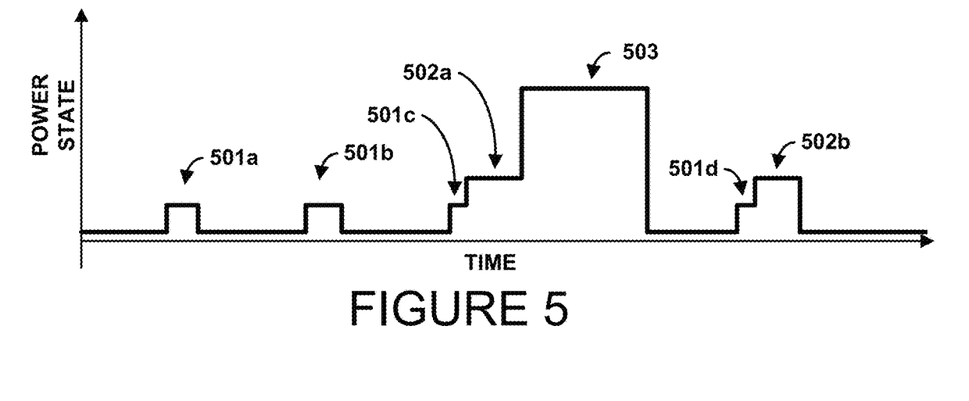
FIG. 5 is a timing diagram for operations of a satellite radio identification system, in accordance with example embodiments.

To make operation of such a system more efficient, the system could operate more than two different power states, each characterized by a respective different level of power consumption. For example, a lowest power state could include un-powering all of the systems of the RF identification system other than, e.g., a timer of a microcontroller in order to wake the system from the lowest power state after a specified period of time has elapsed. This power state is indicated by the lowest power state depicted in FIG. 5. Once the specified period of time has elapsed, the RF identification system could enter a first power state (depicted by 501*a*, 501*b*, 501*c*, and 501*d*) in which the RF identification system attempts to detect a specified RF carrier. If the specified carrier is not detected, the RF identification system could return to the lowest power state. However, if the specified carrier is detected, the RF identification system could enter a second power state (depicted by 502*a* and 502*b*) in which the RF identification system attempts to decode and interpret a command in the specified carrier. If the command is a command to the RF identification system to transmit a response, the RF identification system identification system could enter a third power state (depicted by 503) in which it transmits an RF signal in response to the command. If the command is not a command to the RF identification system to transmit a response, the RF identification system identification system could return to the lowest power state.

II. EXAMPLE SATELLITE IDENTIFICATION TAG SYSTEM

An example CubeSat Identification Tag (CUBIT) radio frequency transponder system was developed to demonstrate a low-SWaP (size, weight, and power) CubeSat RF-based identification system. This CUBIT system addresses the growing need for identifying CubeSats post deployment as mass launches become more commonplace. Such launches make it difficult to assess which radar return corresponds to which CubeSat, especially when coupled with the high mortality rates seen within the CubeSat community. There is a need to better identify individual satellites for better satellite identification and improved troubleshooting. Even for a fully functional CubeSats, the lack of accurate two-line elements (TLEs) for the CubeSat can increase the likelihood that ground assets (e.g., communications and/or ranging antennas) may be improperly aimed at the satellite. CUBIT addresses this need through a low-cost, turnkey RF radio transponder. The disclosed tag concept is composed of two components: (1) an internal Electronics Unit (EU) containing batteries, a radio, and a microprocessor, and (2) an Antenna Unit (AU), containing the antenna and an inhibit photocell, which is mounted on the CubeSat exterior. FIG. 1 shows a schematic of elements of this CUBIT system. The EU consists of an enclosure that houses the main battery and an electronics board. The battery is sized to be capable of supplying CUBIT with approximately 30 days of power at a level that is sufficient to transmit identification data through the critical CubeSat deployment phase. In some instances, the enclosure is made of aluminum or other metallic material. While the illustrated CUBIT includes a standalone power supply, the system may be coupled to a host satellite bus so the internal power from the host satellite may be used for prolonged operations. CUBIT has a simplified electronic circuitry by using system on a chip (SoC) type design. The SoC allows for fewer electronic chips in the system. Further, use of miniature printed circuit board (PCB) designs and miniature components allows for space saving measures on the circuit board. A slide power switch provides a first level of inhibition for CUBIT power. When switched to the "OFF" position, the power is prevented from flowing to a FET switch and low drop-out (LDO) regulator of the CUBIT. The photocell provides a second level of inhibition. Ambient light enables power to flow to the MCU. This power flow itself and/or operations of the MCU may then lock the electrical pathway closed, enabling operation in both day and night after initial light exposure.

The EU is designed to fit in a small volume within the CubeSat structure. The microprocessor is housed on the electronics board, chosen for its low power consumption and its proven performance in extreme environments.

The AU, connected to the EU by a hardline or other cabling, is externally attached to the CubeSat and consists of a photocell and antenna. The ISM 900 MHz Helical style antenna is used for receiving an interrogation signal and for broadcasting the tag's response. The photocell works with integrated hardware inhibit circuitry to prevent operation prior to CubeSat deployment (e.g., via a typical PEAPOD launch envelope which holds the CubeSat in complete darkness until deployment).

CUBIT relies on the above described method to prevent accidental operation prior to achieving orbit. Table 1 provides an overview of Cubit technical specifications. The on-orbit system is complemented with the CUBIT ground station hardware. Its current instantiation sends an interrogation signal through a 10 W amplifier and a 150 ft dish antenna. The interrogation signal can command a response from all tags, all tags except one specified, or from a single specific tag.

Table 1: Cubit technical specifications

Internally-mounted electronics unit (EU) size: ~41 mm×20 mm×18 mm.

Externally-mounted antenna unit (AU) size: ~20 mm×30 mm.

Mass: 21 g.

Mounting: two #0-80 screws, EU orientation unrestricted.

Operational Frequency: 915 MHz.

Transmit Power: ~0.01 W, for 20 ms per interrogation received.

Transmissions per orbit: 25. Tag will only transmit when interrogated by ground station, for total of 500 ms.

Battery Characteristics: 110 mAh-3.7V.

Ground Station: 60 foot dish antenna, typical gain 42 dB, typical bandwidth 1.2°, location latitude 37.40303° N longitude 122.17423° W.

RF inhibits: (i) Timer: 45 min delay of tag function after launch (ii) Command inhibit: Will only transmit when interrogated by Applicant ground station (coded command).

Deployment power inhibits: Photocell inhibits between Power Supply and EU.

CONOPS (concept of operations) Example: CUBIT is armed prior to deployment by flipping a physical switch while the antenna board's photocell is in darkness, as is typical for a CubeSat within a PEAPOD. After the CubeSat deployment from the deployer, the photocell disengages the power inhibit and initiates a time delay (e.g. 45 minutes). Because the time from a Cubit Tag being integrated into a host satellite and the host satellite being launched may span days or even months, minimizing battery power consumption during this period, when the Tag is on the Earth is a design challenge. A two-stage battery switch control (or daisy chain) circuit is used in the Tag power control circuit. The first stage switch will turn battery power ON/OFF, but power will not reach the controller or other electronics unless the 2nd stage switch (photosensor switch) is also triggered by light; in that 'lighted' condition, the Tag will then be fully ON and in operation mode. The photosensor threshold in the Tag is designed such that, at a normal indoor night illumination condition, Tag will be kept OFF and, in a normal indoor daylight illumination condition, Tag will be triggered ON. Such level of photosensor threshold should be sufficient to keep the Tag in power OFF state when inside a satellite enclosure and to power Tag ON after it is launched to orbit and deployed such that the satellite is exposed to sunlight the first time. After the photosensor is trigged by sunlight, the control circuit will lock this state and keep the Tag power ON all the time.

After the time delay, the tag is ready to begin receiving interrogation. The interrogation signal is transmitted from a 150 ft dish at 915 MHz. For a space object with known orbital parameters, the satellite dish can track the assumed location while it is in view, sending interrogation signals through the duration. The received coded command will prompt a response by CUBIT, providing, among other things, confirmation of the commanded signal type and the Tag's device number. CUBIT tag response can be received by the interrogation ground station, or by other locations.

If multiple CubeSats with Cubit Tag devices are available in the sky and they are also in the same ground-station searching zone at the same time, then multiple responses from different Tags at the same frequency and same time will jam the signal. A concept similar to TDMA (time-division multiple access) is adapted in the Tag communication design. Multiple Cubits can receive common inquiry signals from a ground-station at the same time but they each will response in a different time slot.

Experiments

Figure 6:
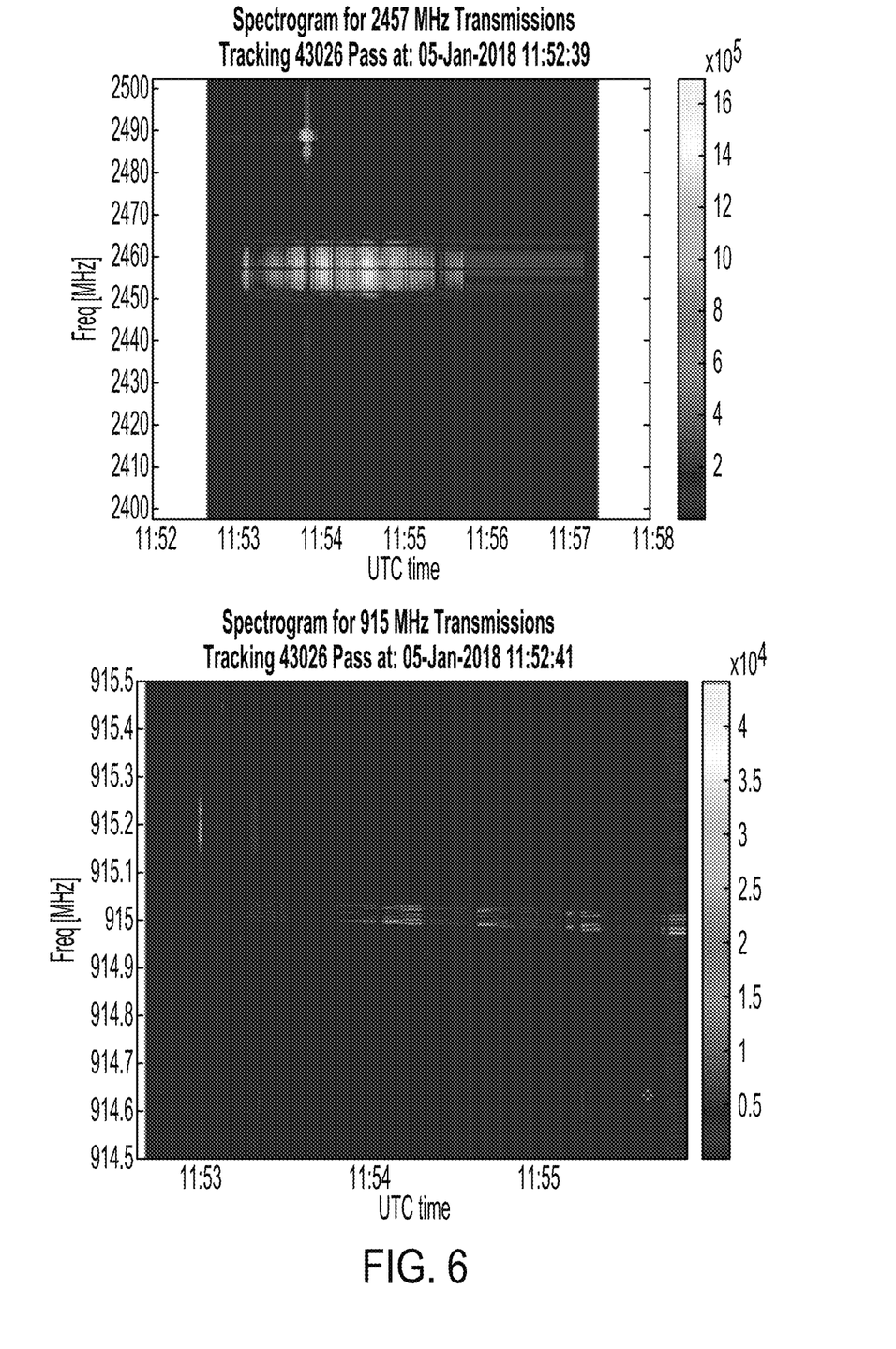
FIG. 6 illustrates acquisition of a beacon at 2457 MHz (top) and 915 MHz (bottom).
Figure 7:
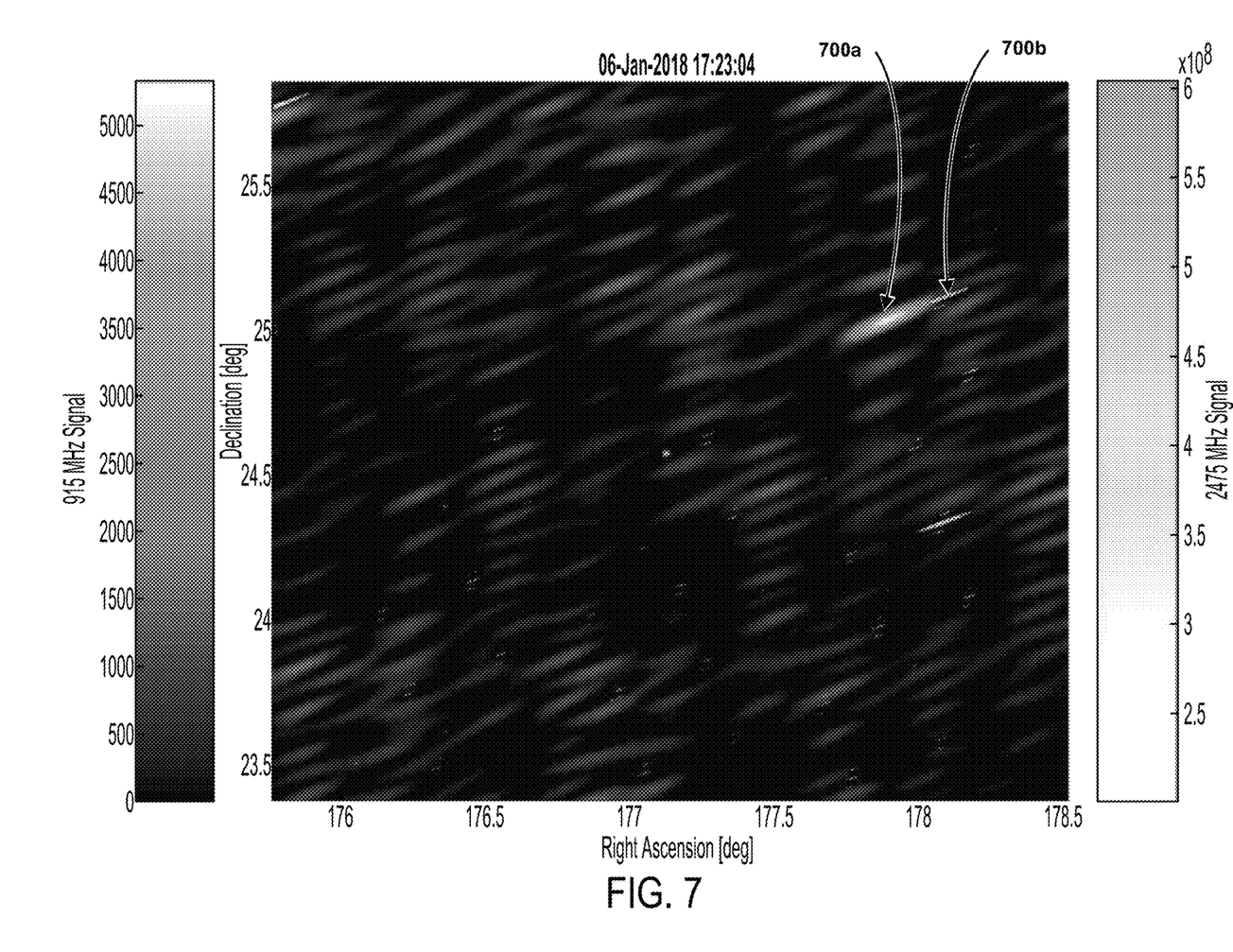
FIG. 7 illustrates correspondence between satellite location determined form a primary satellite beacon and from a CUBIT signal.
Figure 8:
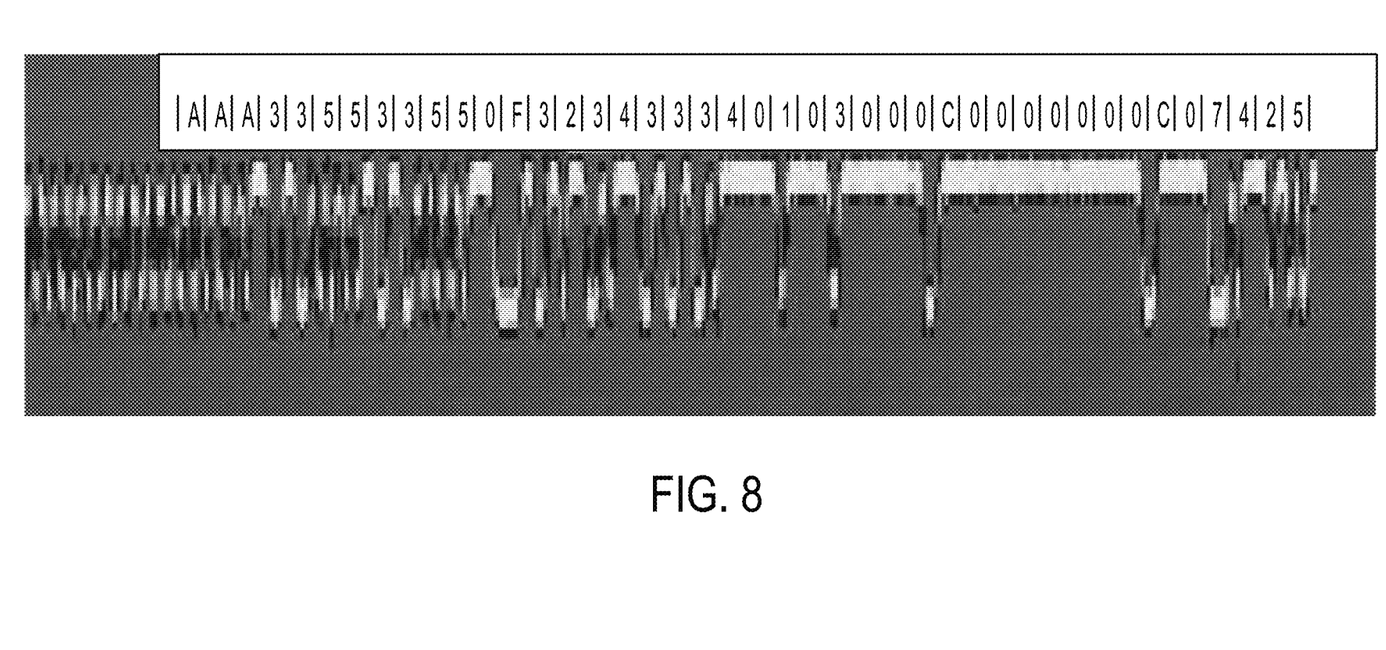
FIG. 8 illustrates a demodulated signal in the time domain in an example implementation.

CUBIT tests were conducted between using a CUBIT tag hosted aboard various satellites. FIG. 6 shows the data collected from a ground interrogation unit on a Cubit apparatus. This, along with object count number equaling the number of expected objects, is indication that the primary satellite had deployed correctly. This flight demonstration shows CUBIT can operate as intended, meaning CUBIT can be a completely separate beacon that can aid in satellite identification. FIG. 6 top panel shows full spectrum acquisition of a beacon from the primary satellite, while the bottom panel shows the spectrum of successful acquisition of ISM signal zoomed around 915 MHz. FIG. 6 shows location information for the 915 MHz and 2457 MHz signals. From the figure, the location of highest signal intensities in both the 2457 MHz and 915 MHz frequency range are collocated. This information indicates that the signal at 915 MHz is indeed the CUBIT tag. FIG. 7 shows an overlap of the primary beacon signal 700*b* overlaid with the CUBIT signal 700*a*, where the brightest signal corresponds to the CUBIT signal at 915 MHz again indicating that CUBIT signal is traceable. The CUBIT signal overlaps well with the signal from the beacon from the primary satellite at that frequency indicating that CUBIT was functioning as anticipated. FIG. 8 shows the received signal following demodulation to generate a data signal, demonstrating the appropriate and expected waveform of a CUBIT tag. The time domain signal analysis of the signal received revealed characteristics definitive of the CUBIT tag output.

Further System Considerations

General: The low-Earth orbit (LEO) is considered a harsh environment. In addition to the vacuum of space ($10^{-6}$ torr), components must survive wide temperature swings (120° C. to −100° C.).

Low on-orbit SWAP: Most CubeSats are volume constrained, with minimal space for additional systems. As such, CUBIT is quite small to easily integrate within the main satellite structure and reduce system impact. CUBIT's external-facing segment are minimized and additional hardware can be internalized within the CubeSat and connected to the external unit via a cable. On-Orbit SWaP minimization will affect ground station design. In general, a weaker On-Orbit component will require a larger, more powerful ground component. There is minimal integration with the host device. Dependence on a relatively unreliable host CubeSat for essential systems such as power and communications reduces the utility of CUBIT and greatly increases the risk of a completely dead CubeSat with no identification methodology available. Additionally, CUBIT can be designed to accept different bus voltages (in the case of integrating with host power), or communication protocols (in the case of integration with host communications systems), which would greatly increase development costs. Therefore, host integration was limited to a physical only interface.

Low-cost: CubeSats needing an independent identification method such as CUBIT. Cubit was designed with mostly of low-cost COTS components lowering barrier for implementation.

Procedures: Nominal CONOPS

The CONOPs takes place in four steps, beginning with a CUBIT-outfitted Cubesat launched to orbit on a rideshare launch:

1. The CubeSat is deployed from the rideshare launch vehicle.
2. The deployment activates the CUBIT initiation sequence by exposing the photocell inhibitor to light. After a delay time, such as 45 minutes (from a second inhibitory timer), the tag is now prepared to receive interrogation signals from the ground station.
3. As the CUBIT-outfitted CubeSat passes into view of a 150-ft dish ground station, a unique interrogation code is sent.
4. During co-visibility events, the ATA is tuned to receive the CUBIT response. Post-pass analysis reveals the presence of the CUBIT tag and the unique ID code.

Inhibit Design

Launch requirements typically specify inactivation of secondary payloads (Cubit) to prevent interference with the launch vehicle. CUBIT employs multiple RF and deployment power inhibits to accomplish this. The photocell works with integrated inhibits to prevent operation prior to CubeSat deployment (a typical PEAPOD launch envelope holds the CubeSat in complete darkness until deployment). CUBIT relies on this method to prevent accidental operation prior to achieving orbit. A slide power switch provides the first inhibit level. When switched to the "OFF" position, the power is prevented from flowing to the Field Effect Transistor (FET) switch and Low Drop Out (LDO) regulator. The photocell provides the second inhibit level. Ambient light enables power to flow to the MCU, allowing the electrical pathway to be locked closed, enabling operation in both day and night after initial light exposure.

Configuration

CUBIT is armed prior to deployment by flipping a physical switch while the antenna board's photocell is in darkness, as is typical for a CubeSat within a PEAPOD. After the CubeSat deployment from the deployer, the photocell disengages the power inhibit and initiates a time delay. After the time delay, after which the tag is ready to begin receiving interrogation. The interrogation signal is transmitted from a ground station (such as a 150 ft Dish at 915 MHz). For a space object with known orbital parameters, the satellite dish can track the assumed location while it is in view, sending interrogation signals through for the duration when passing within view. The received coded command will prompts a response by CUBIT, providing, among other things, confirmation of the commanded signal type and the tag's device number. A CUBIT tag response can be received by the interrogation ground station. Ground station segments can also be set up to enable "fly through" of CubeSats for Space-Fence-like detection and identification.

Ground Segment

The On-Orbit system is complemented by the CUBIT ground station hardware.

Its current instantiation uses the same chipset to send an interrogation signal through a 10 W amplifier and a 150-ft dish, though a different chipset, power rating, or antenna size or type could be employed. The interrogation signal can command a response from all tags, all tags except one specified, or from a single specific tag.

Cubit software architecture: The Cubit software suite consists of three software modules.

Satellite Module, a receive/respond configuration. When the radio receives a valid command interrogation, the satellite will respond back with the appropriate response.

Ground Station Transmit Module, responsible for transmitting the command interrogation beacons to the satellite. It is connected via Universal Asynchronous Receiver/Transmitter (UART) to the Command & Control (C2) user interface (UI) application running on a host PC.

Ground Station Receive Module, responsible for receiving satellite responses. It is connected via UART to the C2 UI application running on a host PC.

Each module is structured identically, except for the underlying business logic. A module is a compiled 'C' program with a main function entry point. The main function performs all the housekeeping functions such as initializing the general purpose input/output port directions, timer interrupts and the radio operational characteristics. The main function then enters into a cyclic executive loop which runs the registered timer callbacks and checks if the radio and/or the MCU can enter a sleep state. The loop continues until the device is powered off or in the case of the Satellite Module a Watch Dog timer has expired, and the device restarted. All of the device business logic is defined in either a timer expiration callback or within interrupt service routines.

The business logic for all three devices is defined by the following four beacon commands: (i) all satellites respond; (ii) all satellites except satellite ID X respond; (iii) only satellite with ID X respond; or (iv) satellite X responds with long beacon (multiple responses for each interrogation beacon).

Software Architecture Module Description

Satellite Module: The Satellite Module's default state is a receive mode with a 16 Hz wake on receive (WOR) timing interval. During the period when the radio is not in receive mode, the microcontroller (MCU) and the radio are in a sleep state. When the WOR timer expires, the radio wakes up and begins to listen for a transmission preamble. If a preamble byte sequence is detected, the radio listens for the correct packet stream. This stream includes a sync word of four bytes, packet length, and source and destination address (MAC) bytes. Subsequent bytes include the command payload and satellite identification number, followed by a 16-CRC checksum value.

When the satellite radio receives a valid packet, it verifies that the destination MAC address matches its own before passing the packet on to the MCU. In the current configuration, all satellites use the same destination address so that all satellites will process every transmitted packet. Each satellite is assigned a unique numeric satellite identification number, which is part of the packet payload.

When the satellite receives a command that requires action, it will respond with a reply of that command that consists of the original command along with its own satellite ID (SID). Appended to the response payload will be temperature and battery status data. The response packet will also include the Ground Station MAC address as a destination and its own MAC address to identify the source. These addresses are not used in processing the packet in the Ground Station.

Ground Station TX Module

The Ground Station TX Module's default state is constant beacon interrogation mode at a rate of 32 Hz. One of four command beacons is transmitted at a given time. Transmission of command packet is triggered by the expiration of a hardware timer. The timer is initialized during startup and reinitialized after the transmission interrupt has been serviced. Beacon commands are manipulated via the Ground Station Command & Control (C2) UI application. Communication to the C2 UI application is RS232 UART with a data rate of 115200/8/1. Command messages to the Ground Station TX Module from the C2 UI application are validated and acknowledged upon receipt.

Ground Station RX Module

The Ground Station RX Module's default state is continuous receive mode. In this state, the radio listens for well-formed response packets with a MAC address that matches a satellite response. The radio front-end will analyze the packet and determine whether the packet should be forwarded to the MCU. If the packet is valid, the radio triggers an interrupt and passes the packet to the MCU as a parameter of the interrupt service routine.

Beacon responses are sent to the Ground Station C2 UI application. Communication to the C2 UI application is RS232 UART with a data rate of 115200/8/1. Response messages from the Ground Station RX Module to the C2 UI application are validated and acknowledged upon receipt.

Software Architecture Radio Characteristics

The radio is controllable through its registers, which are mapped into the X data space of the microcontroller. The MCU is interrupted at a programmable first-in, first-out (FIFO) fill level. The digital IF channel filter and the demodulator extract the data bit-stream from the incoming IF signal and must be programmed to match the modulation scheme as well as the data rate.

The RadioLab Software calculates the necessary register settings for a specified configuration. The register setup is done once at power-up of the device.

The radio is configured in raw mode and does not perform any packet delimiting or byte synchronization. It simply serializes transmit bytes and de-serializes the received bit-stream and groups it into bytes. This mode is ideal for implementing custom protocols in software. The receiver does not receive anything until it detects a user-programmable bit pattern (called the preamble) in the receive bit-stream. When it detects the preamble, it aligns the de-serialization to it. In both the uplink and downlink transmissions, the preamble is 32 bits long. The uplink transmission extends the preamble transmission length to 60 ms to allow the satellite to perform its WOR sequence and recognize the transmission.

Software Architecture Radio Packet Definition

Both the uplink and downlink packet have identical structures to simplify packet parsing, as only one parser is needed in both the Ground Station and Satellite modules. This also makes extension of the packet format easier. All bytes except the CUBIT payload bytes are defined in the radio driver software using the AXRadioLab utility. The CUBIT payload is defined as:

1 byte—Beacon command. The commands correspond to the following: # define CMD_ALL_RESPOND 0x01; # define CMD_ALL_RESPOND_X 0x02; # define CMD_ONLY_X_RESPOND 0x03; # define CMD_TAG_X_LONG_BEACON 0x04.

2 bytes—SID. In the uplink packet, the SID is the target satellite of the command and in the downlink packet the SID is the responding satellite ID.

2 bytes—Device temperature. This field is ignored in the uplink packet and only populated in the downlink packet when a satellite responds.

2 bytes—Battery status. This field is ignored in the uplink packet and only populated in the downlink packet when a satellite responds.

2 bytes—Reserved for future use. Both uplink and downlink packets ignore this value.

Software Architecture Ground Station Command & Control

The Ground Station Command & Control (GSC2) is a UI application developed in C#. The main screen is divided into two sections:

The beacon command section, where the operator has the ability to select each type of beacon command and assign the command to include/exclude a specific SID.

The response section, where all satellite responses are displayed with a timestamp of reception. The operator has the ability to save or clear the response window. There is also the ability to configure the serial port setting when communicating with the Ground Station RX & TX modules.

Power Architecture

Background: One power control requirement for CubeSat ID Tag module during launch time is that the module must be either completely powered down or running under minimal power conditions (e.g., only to power necessary sensor(s)). There will be absolutely no RF transceiver function and no radiated emissions from the CubeSat ID Tag module at that time.

Only after the host CubeSat has been deployed in space, and after a 45-minute timer countdown, can the ID Tag module go into the state of normal operations.

System State Definition: The system has three different power states, depending on levels detected by the combined Ultraviolet (UV) index and ambient light sensor (Silicon Labs model #Si1132):

1) Before Launch state (e.g., in integration process). The UV sensor indicates the UV level is at a normal level (indoor condition where UV index is <6) and the visible light sensor is also at a normal level.

2) In Launch state (packed into a dark box ready for launch). The UV sensor indicates the UV level is at very low level (UV index is <3), and the visible light sensor also sees no light. This period can be days or even weeks.

3) Post Deployment state (in orbit). The UV sensor indicates the UV level is very high (UV index is >10) and the visible light sensor sees a light level greater than 10 lux. To achieve these states, CUBIT uses an adaptive power control method, which consists of a UV sensor (and visible light sensor), an MCU with timer, and FET switch(es) or MCU GPIO control lines.

a) Operation: The timer can wake up (via a wakeup call) the MCU at every hour (or adjustable time period). When waking up, the MCU will read the UV sensor and determine the state of the ID tag. If not in the Post Deployment state, the MCU will go to sleep mode until the next wakeup call.

This wakeup call process will happen continually until the MCU determines the ID tag is at the Post Deployment state. After positively identifying that the ID Tag is in the Post Deployment state, the MCU will trigger a 90-min timer countdown and terminate this adaptive power control process. The above three states cannot be reversed unless manually reset by a person.

For example, in Launch state, and when the MCU detects the UV level is above a preset value, the MCU will record this value and reduce the timer to 5 min and go to sleep again. If the MCU reads a UV level above the preset value three consecutive times, the MCU will declare the ID tag is at Post Deployment state and start the 90-min timer countdown. If not, it will go back to In Launch state and the wakeup call will reset to 45 min.

b) Power consumption for adaptive power control method: The CubeSat ID Tag can sit on a shelf in the integration stage (before launch) and be in the box (in launch) for weeks or even months. The following is the power consumption calculation for this adaptive power control method.

MCU (MSP430) off mode (fast wake-up and timer is running) 1.2 µA.

MCU (MSP430) active mode 230 µA.

UV sensor (Silicon Labs Si1132) standby mode<500 nA.

UV sensor (Silicon Labs Si1132) actively measuring 4.3 mA, actively measuring time 285 µs.

(1) ID Tag Module in Sleep Mode

MCU off mode+UV sensor standby mode=1.2 µA+0.5 µA=1.7 µA.

Power consumption of ID Tag module in sleeping mode in a week: 24×7×1.7=285.6 µAh~0.3 mAh.

(2) ID Tag Module in UV Measuring Mode

MCU active mode+UV sensor actively measuring mode=230 µA+4.3 mA=4.6 mA.

Time used for UV actively measuring mode: MCU~1 ms and UV sensor~300 µs=~1.3 ms.

UV actively measuring mode in a day (24 hours)=24 times.

Power consumption of ID Tag module in UV measuring mode in a week: 24 times×7 days=168 time. 168×1.3 ms=218.4 ms=~0.22 s=0.0037 hours. 0.0037 hr×1.3 mA=0.0048 mAh.

Power Architecture Summary:

ID Tag module in UV measuring mode has an extremely low power consumption (0.005 mAh/week as compared to the power consumption of the ID Tag module in sleeping mode (0.3 mAh/week)).

Power consumption in sleeping mode of 0.3 mAh/week is very low.

Even if an ID Tag module is sitting on a shelf and/or waiting for launch for 10 weeks, it will only consume 3 mAh, which is very small and permits the size, cost, and mass of the power source for the ID tag to be reduced.

III. EXAMPLE METHODS

Figure 9:
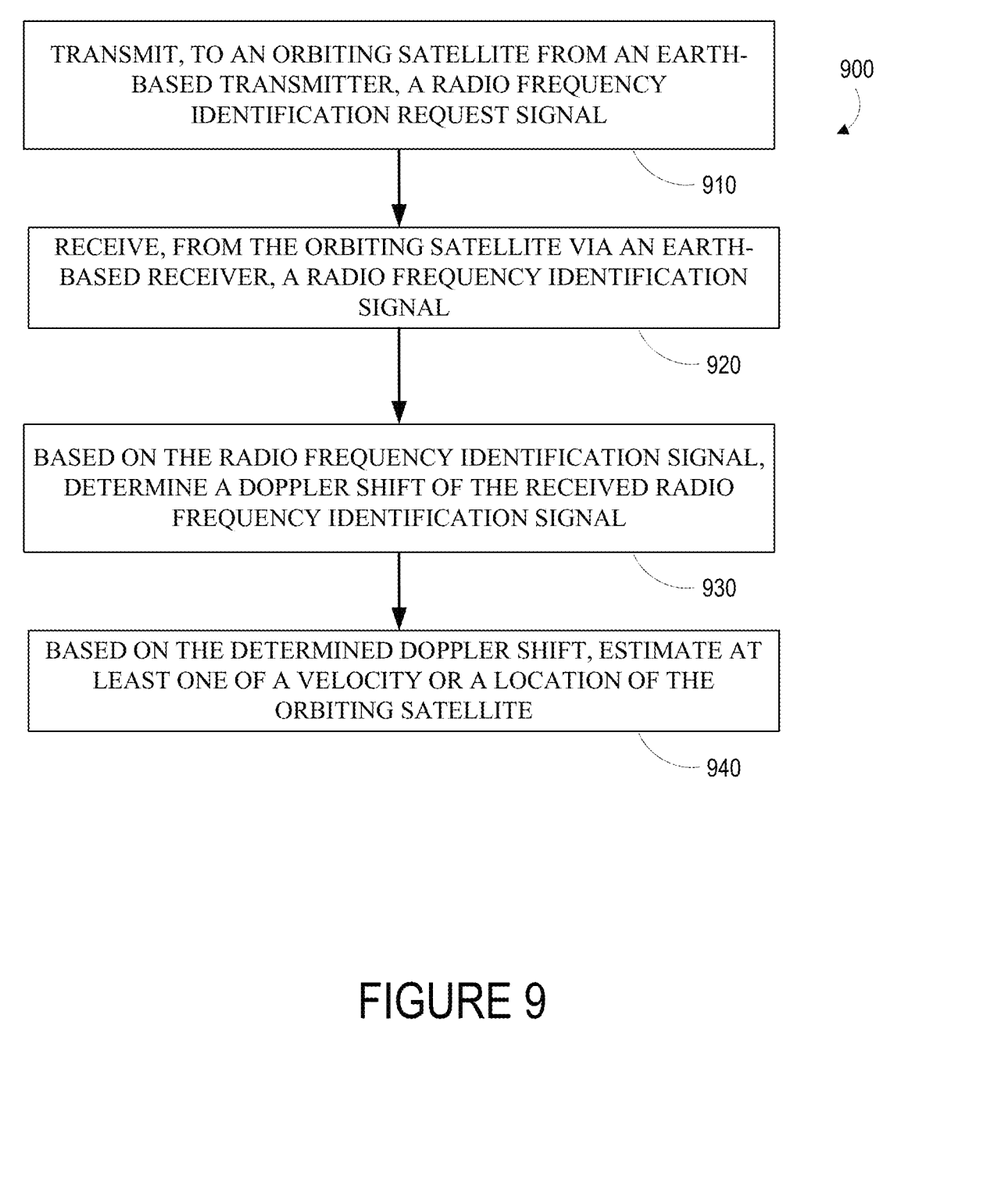
FIG. 9 is a flowchart of an example method.

FIG. 9 is a flowchart of a method 900 for generating improved estimates of the velocity and/or location of a satellite that incorporates the systems disclosed herein or some other radio frequency satellite transmitter system for identification and system status communication. The method 900 includes transmitting, to an orbiting satellite from an Earth-based transmitter, a radio frequency identification request signal (910). This could include driving a directional antenna (e.g., a dish antenna) to direct the transmitted request signal toward an estimated location of the orbiting satellite in order to, e.g., reduce the power requirements and/or increase the likelihood of successful reception of the signal by the satellite. The method 900 additionally includes receiving, from the orbiting satellite via an Earth-based receiver, a radio frequency identification signal (920). This could be done using the same antenna or other systems used to transmit the radio frequency identification request signal (e.g., the same direction-controlled dish antenna) or a different antenna. For example, a second dish antenna or other directional antenna, located at another location from the antenna used to transmit the radio frequency identification request signal, could be used to receive the signal from the satellite. This could be done, e.g., to improve the accuracy of determination of the location of the satellite by allowing additional directional information from the additional antenna to be used.

The method 900 additionally includes based on the radio frequency identification signal, determining a Doppler shift of the received radio frequency identification signal (930). This could be done, e.g., by estimating a frequency of the radio frequency identification signal as it was transmitted from the satellite (e.g., an estimated local oscillator frequency, a specified local oscillator frequency) and determining a difference between that frequency and a detected frequency of the received radio frequency identification signal (e.g., a carrier frequency, a center frequency). Estimating the frequency of the radio frequency identification signal as it was transmitted from the satellite could include using information provided in the radio frequency identification signal. For example, the radio frequency identification signal could be encoded to represent one or more voltages detected by the satellite (e.g., battery voltages, transmitter supply voltages, oscillator supply voltages, or a voltage applied and/or provided to some element(s) relevant to the generation and/or transmission of the radio frequency identification signal by the satellite), a temperature detected by the satellite (e.g., a temperature of a local oscillator, of a microcontroller integrated circuit, of a transmitter, and/or some other element(s) relevant to the generation and/or transmission of the radio frequency identification signal by the satellite), and/or some other detected physical parameter that is related to and/or indicative of the operational frequency (e.g., carrier frequency) of the oscillator and/or transmitter used to transmit the radio frequency identification from the satellite. These detected variables could be decoded from the received radio frequency identification signal and used to estimate the frequency of the radio frequency identification signal as it was transmitted from the satellite. For example, a detected supply voltage and temperature of a local oscillator or other transmitter component could be used to estimate the frequency of a radio frequency identification signal transmitted from the satellite using the local oscillator or other transmitter component.

The method 900 additionally includes, based on the determined Doppler shift, estimating at least one of a velocity or a location of the orbiting satellite (940).

The method 900 may include additional or alternative steps or features. For example, the received radio frequency identification signal could be indicative of a temperature and a supply voltage of a radio frequency transmitter of the orbiting satellite that generated the radio frequency identification signal, and determining the Doppler shift of the received radio frequency identification signal based on the radio frequency identification signal could include: (i) determining a frequency of the received radio frequency identification signal; (ii) determining, based on the received radio frequency identification signal, the temperature and supply voltage of the radio frequency transmitter; (iii) based on the determined temperature and supply voltage, determining an operating frequency of the radio frequency transmitter; and (iv) determining a difference between the operating frequency of the radio frequency transmitter and the frequency of the received radio frequency identification signal.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
an external unit, wherein the external unit comprises an antenna and a sensor;
a base unit, wherein the base unit comprises a housing, a battery, and a controller; and
a cable that electrically couples the external unit to the base unit,
wherein the controller is configured to exit a low-power state in response to a signal from the sensor, and wherein the controller comprises one or more processors configured to perform controller operations including:
detecting, based on a signal output from the sensor, that the system is in space; and
responsive to detecting that the system is in space, transmitting a radio frequency identification signal from the antenna.

2. The system of claim 1, wherein the sensor is a light sensor.

3. The system of claim 1, wherein sensor comprises at least one of a mechanical switch, an ultraviolet-sensitive material that disintegrates when exposed to ultraviolet light, a pressure-sensitive material, or a material that outgasses when exposed to pressures below a threshold pressure thereby changing an electrical property of the material.

4. The system of claim 1, wherein detecting that the system is in space based on a signal output from the sensor comprises detecting that the signal output from the sensor is indicative of the system being in space for more than a threshold duration of time.

5. The system of claim 1, further comprising an electrical switch, wherein the electrical switch couples the controller to the battery, and wherein the electrical switch is coupled to the sensor such that the electrical switch electrically disconnects the controller from the battery unless the signal output from the sensor is indicative of the system being in space.

6. The system of claim 1, wherein the housing comprises a volume of metal thermally coupled to the controller such that the housing sinks at least a portion of heat generated by the controller.

7. The system of claim 1, wherein the external unit additionally comprises a circuit board and one or more additional electronic components, wherein the one or more additional electronic components comprise at least one of a capacitor, an inductor, a resistor, a resonator, a crystal, a transistor, or an integrated circuit, wherein the one or more additional electronic components are electrically coupled to at least one of the antenna or the sensor, wherein the antenna and the sensor are disposed on a first side of the circuit board, and wherein the one or more additional electronic components are disposed on a second side of the circuit board that is opposite the first side.

8. The system of claim 1, wherein the controller operations further comprise:
detecting, using the antenna, a radio frequency identification request signal, wherein transmitting the radio frequency identification signal from the antenna responsive to detecting that the system is in space comprising transmitting the radio frequency identification signal from the antenna responsive to detecting the radio frequency identification request signal and detecting that the system is in space.

9. The system of claim 8, wherein the system further comprises:
a radio frequency receiver, wherein using the antenna to detect the radio frequency identification request signal comprises operating the radio frequency receiver to use the antenna to detect the radio frequency identification request signal, and wherein the controller operations further comprise:
during alternating time periods subsequent to exiting the low-power state in response to the signal from the sensor, operating the system in a first power state and a second power state, wherein operating the system in the first power state comprises electrically connecting the battery to the radio frequency receiver such that the radio frequency receiver is powered by the battery, and wherein operating the system in the second power state comprises electrically disconnecting the battery from the radio frequency receiver such that the radio frequency receiver is unpowered.

10. The system of claim 1, further comprising a global navigation satellite system receiver, and wherein the controller operations further comprise:
detecting, using the global navigation satellite system receiver, that the system is located within a specified region of space, wherein transmitting the radio frequency identification signal from the antenna responsive to detecting that the system is in space comprises transmitting the radio frequency identification signal from the antenna responsive to detecting that the system is located within the specified region of space and detecting that the system is in space.

11. A satellite comprising:
a satellite bus, wherein the satellite bus comprises a payload controller, a payload power source, and a bus housing, wherein the bus housing has an external surface; and
a radio identifier system comprising:
an external unit, wherein the external unit comprises an antenna, and wherein the external unit is disposed on the external surface of the bus housing;
a sensor;
a base unit, wherein the base unit comprises a base unit housing, an identifier system battery, and an identifier system controller; and
a cable that electrically couples the external unit to the base unit;
wherein the identifier system controller is configured to exit a low-power state in response to a signal from the sensor, and wherein the identifier system controller comprises one or more processors configured to perform controller operations including:
detecting, based on a signal output from the sensor, that the system is in space; and
responsive to detecting that the system is in space, transmitting a radio frequency identification signal from the antenna.

12. The satellite of claim 11, wherein the sensor is part of the external unit, and wherein the sensor is a light sensor.

13. The satellite of claim 11, wherein the sensor is part of the external unit, and wherein sensor comprises at least one of a mechanical switch, an ultraviolet-sensitive material that dissolves when exposed to ultraviolet light, a pressure-sensitive material, or a material that outgasses when exposed to pressures below a threshold pressure thereby changing an electrical property of the material.

14. The satellite of claim 11, wherein the sensor is part of the external unit, and wherein detecting that the system is in space based on a signal output from the sensor comprises detecting that the signal output from the sensor is indicative of the system being in space for more than a threshold duration of time.

15. The satellite of claim 11, wherein the radio identifier system is electrically isolated from the satellite bus.

16. The satellite of claim 11, wherein the controller operations further comprise:
detecting, using the antenna, a radio frequency identification request signal, wherein transmitting the radio frequency identification signal from the antenna responsive to detecting that the system is in space comprising transmitting the radio frequency identification signal from the antenna responsive to detecting the radio frequency identification request signal and detecting that the system is in space.

17. The satellite of claim 16, wherein the radio identifier system further comprises:
a radio frequency receiver, wherein using the antenna to detect the radio frequency identification request signal comprises operating the radio frequency receiver to use the antenna to detect the radio frequency identification request signal, and wherein the controller operations further comprise:
during alternating time periods subsequent to exiting the low-power state in response to the signal from the sensor, operating the system in a first power state and a second power state, wherein operating the system in the first power state comprises electrically connecting the identifier system battery to the radio frequency receiver such that the radio frequency receiver is powered by the identifier system battery, and wherein operating the system in the second power state comprises electrically disconnecting the identifier system battery from the radio frequency receiver such that the radio frequency receiver is unpowered.

18. The satellite of claim 16, wherein the sensor comprises a light sensor, wherein the satellite bus further comprises a light emitter, and wherein the payload controller is configured to operate the light emitter to illuminate the light sensor.

* * * * *